(12) United States Patent
Youngs

(10) Patent No.: US 12,454,969 B2
(45) Date of Patent: Oct. 28, 2025

(54) CAM LEVER ASSEMBLY

(71) Applicant: JBJ Civil Pty Ltd, Worongary QL (AU)

(72) Inventor: James Youngs, Worongary (AU)

(73) Assignee: ARCHDEVCO IP PTY LTD (AU)

( * ) Notice: Subject to any disclaimer, the term of this patent is extended or adjusted under 35 U.S.C. 154(b) by 241 days.

(21) Appl. No.: 17/994,316

(22) Filed: Nov. 26, 2022

(65) Prior Publication Data

US 2023/0167839 A1    Jun. 1, 2023

(30) Foreign Application Priority Data

Nov. 26, 2021   (AU) ................................. 2021903840
Nov. 29, 2021   (AU) ................................. 2021903861

(51) Int. Cl.
F16B 2/18         (2006.01)
(52) U.S. Cl.
CPC ..................................... F16B 2/185 (2013.01)
(58) Field of Classification Search
CPC ....................................................... F16B 2/185
See application file for complete search history.

(56) References Cited

U.S. PATENT DOCUMENTS 3,245,642 A  *  4/1966  Dicke ................... H01Q 1/1228
                                                    248/539
4,338,875 A  *  7/1982  Lisowski ................ B63B 71/00
                                                    114/221 R (Continued)

FOREIGN PATENT DOCUMENTS

KR          101005220     * 12/2010

OTHER PUBLICATIONS https://www.Kippusa.com/us/en/Products/Adjustable Handles/Cam-Levers.html/; downloaded Aug. 3, 2023 (3 pgs.).

(Continued)

Primary Examiner — Mark A Williams
(74) Attorney, Agent, or Firm — MORRISS O'BRYANT COMPAGNI CANNON, PLLC

(57) ABSTRACT

A quick release cam lever assembly for use with the collar (14) of a collar clamp (10) to secure a shaft (16) when received by the collar is provided. The collar is an open-ended ring with outwardly directed opposed flanges (18, 20) spaced apart from another by a gap (22) between the ends of the ring, and the cam lever assembly comprises a cam lever (12, 56) having a first end region (26) terminating in at least one cam element (28, 62), the cam element being rotatable about an axis of rotation of the lever. The cam lever assembly also comprises a fastener (30, 60) with one end coupled to the cam element and having an opposite end for passage through one of the flanges (18) of the collar and reception by the other of the flanges (20), wherein the cam element is for engagement with a bearing surface (42) of the clamp to draw the flanges together upon the lever (12, 56) being rotated about its axis of rotation from an open position to a locking position for securing of the shaft by the collar. The lever is bent to overlie the flanges (18, 20) of the collar (14) whereby an opposite end region (46) of the lever lies side by side with respect to the fastener (30, 60) when the lever is in its locking position. There is also provided the collar clamp (10) incorporating the cam lever assembly. The collar clamp can be part of a mount. The shaft (16) for being received by the collar clamp can be the shaft of an antenna and the mount can be for mounting the antenna to a vehicle, or other mount for the antenna. Additionally, there is provided a method for mounting an antenna to a vehicle or other support utilising a mount including the collar clamp (10) and cam lever assembly.

16 Claims, 4 Drawing Sheets

(56) References Cited

U.S. PATENT DOCUMENTS

| | | | | |
|---|---|---|---|---|
| 7,758,502 | B2* | 7/2010 | Phillips | F16B 2/185 |
| | | | | 248/68.1 |
| 7,823,957 | B2* | 11/2010 | Williamson | B60J 7/104 |
| | | | | 292/DIG. 49 |
| 10,411,340 | B2* | 9/2019 | Ligander | F16M 11/126 |
| 2002/0084948 | A1* | 7/2002 | Watson | H01Q 3/02 |
| | | | | 343/882 |
| 2018/0320721 | A1* | 11/2018 | McCarty | F16K 31/00 |
| 2018/0346068 | A1* | 12/2018 | Calendrille, Jr. | B62M 9/124 |
| 2020/0188723 | A1* | 6/2020 | Reibman | A63B 21/0724 |
| 2022/0143453 | A1* | 5/2022 | Martin | F16B 2/06 |

OTHER PUBLICATIONS

Articles and White Papers by Keyword; Kipp. Inc. Press Release date Jul. 18, 2014, (4 pages).
Sitech-Central; Trimble Component Sheets; Sep. 2020 (6 pages).

* cited by examiner

CAM LEVER ASSEMBLY

CROSS-REFERENCE TO RELATED APPLICATIONS

This application is a national stage entry claiming priority to Australian Provisional Patent Application No. 2021903840, filed Nov. 26, 2021, and also claims priority to Australian Provisional Patent Application No. 2021903861, filed Nov. 29, 2021, the contents of both being incorporated herein by reference.

FIELD OF THE INVENTION

The present invention relates to a cam lever assembly. The assembly has application for use in a collar clamp.

BACKGROUND TO THE INVENTION

Collar clamps have a wide range of applications including being incorporated in antenna mounts for securing the shaft of the antenna to the mount. The collar clamp of such mounts may be tightened by rotation of the handle of a threaded locking fastener. However, the tightening of such handle fasteners risks sprains to the wrist of the user particularly when the user is seeking to maximise the tightness with which the antenna is held by the clamp. The tightness with which the clamp is tightened may also be limited by the grip the user is able to exert on the handle and the relative strength of the twisting action that can be exerted by the user. If overtightened, it can be difficult to release the clamp with the potential for further risk of injury to the user. Additionally, the handle can be relatively bulky and protrude from the clamp, rendering the handle at risk of damage or loosening arising from inadvertent impacts to the handle. Such hand rotatable locking fasteners can also loosen due to vibration or other causes such as in mounts on motor vehicles in the event the handle was insufficiently tightened.

SUMMARY OF THE INVENTION

Broadly stated, the present invention relates to a cam lever assembly for use with a collar clamp or mount including a collar clamp, to secure a shaft such as that of an antenna.

More particularly, in an aspect of the present invention there is provided a quick release cam lever assembly for use with the collar of a collar clamp to secure a shaft when received by the collar, the collar being an open-ended ring with outwardly directed opposed flanges spaced apart from another by a gap between the ends of the collar, and the cam lever assembly comprising:

a cam lever having a first end region terminating in at least one cam element, the cam element being rotatable about an axis of rotation of the lever; and a fastener with one end coupled to the cam element and having an opposite end for passage through one of the flanges of the collar and reception by the other of the flanges, wherein the cam element is for engagement with a bearing surface of the clamp to draw the flanges together upon the lever being rotated about its axis of rotation from an open position to a locking position for securing of the shaft by the collar, and wherein the lever is bent to overlie the flanges of the collar whereby an opposite end region of the lever lies side by side with respect to the fastener when the lever is in its locking position.

Typically, a centre axis of the cam element is offset with respect to the axis of rotation of the lever, the centre axis and the axis of rotation being parallel to one another.

Typically, the first end region of the cam lever terminates in a pair of opposed cam elements, wherein the cam elements are spaced apart from one another and the one end of the fastener is disposed between the cam elements.

In other embodiments, the cam lever terminates in a single cam element and the cam element receives the one end of the fastener.

Typically, the cam lever assembly also comprises a pivot pin defining the axis of rotation of the cam lever whereby the fastener is pivotably mounted to the pivot pin.

Typically, the one end of the fastener receives the pivot pin to thereby couple the fastener to the at least one cam element.

Typically, the cam lever assembly also comprises a washer for being received on the fastener and located between the at least one cam element and the one said flange of the clamp, wherein the washer provides the bearing surface of the clamp. The bearing surface of the washer is generally curved to accommodate the at least one cam element of the lever. In particularly preferred embodiments, the bearing surface of the washer is concave.

Typically, the opposite end of the fastener is threaded for threaded engagement with the other of the flanges of the collar. In other embodiments though, the faster may pass through the other of the flanges and threadably mate with a nut disposed behind that flange for pulling that flange toward the flange facing the cam element(s) of the lever together when the cam lever is rotated to its locked position.

In particularly preferred embodiments, the cam lever is generally L-shaped and the first end region of the lever terminating in the at least one cam element is of a length to allow the opposite end region of the lever to overlie the flanges of the collar and be oriented side by side with respect to the fastener when the lever is rotated to its locking position.

Typically, the opposite end region of the lever is oriented to lie essentially parallel to the fastener when the cam lever is in its locked position in use.

Typically, the opposite end regions of the lever are essentially perpendicular to one another.

In another aspect the present invention provides for the cam lever itself for assembly with the fastener.

In another aspect of the invention there is provided collar clamp for securing a shaft, the clamp comprising:

a collar for receiving the shaft and being in the form of an open-ended ring with outwardly directed opposed flanges spaced apart from another by a gap between the ends of the collar;

a cam lever having a first end region terminating in at least one cam element, the cam element being rotatable about an axis of rotation of the lever; and a fastener with one end coupled to the cam element and having an opposite end for passage through one of the flanges of the collar and reception by the other of the flanges, the cam elements being for engagement with a bearing surface of the clamp to draw the flanges together upon the lever being rotated about its axis of rotation from an open position to a locking position for securing of the shaft by the collar, and wherein the lever is bent to overlie the flanges of the collar whereby an opposite end region of the lever lies side by side with respect to the fastener when the lever is in its locking position.

In particularly preferred embodiments, the collar clamp is part of a mount for the shaft.

In another aspect of the invention there is provided a mount for a shaft, the mount incorporating a collar clamp embodied by the invention.

In another aspect of the invention there is provided a mount for the mounting of a shaft, the mount comprising:
 a collar clamp for securing a shaft, the clamp comprising a collar for receiving the shaft and being in the form of an open-ended ring with outwardly directed opposed flanges spaced apart from another by a gap between the ends of the collar; and
 a base on which the collar clamp is disposed;
 the collar clamp including a cam lever with a first end region terminating in at least one cam element, the cam element being rotatable about an axis of rotation of the lever; and
 a fastener with one end coupled to the cam element and having an opposite end for passage through one of the flanges of the collar and reception by the other of the flanges, the cam elements being for engagement with a bearing surface of the clamp to draw the flanges together upon the lever being rotated about its axis of rotation from an open position to a locking position for securing of the shaft by the collar, and wherein the lever is bent to overlie the flanges of the collar whereby an opposite end region of the lever lies side by side with respect to the fastener when the lever is in its locking position.

Typically, in embodiments described herein the collar clamp is integrally formed with a base of the mount.

In particularly preferred embodiments, a rear region of the collar opposite to the gap between the flanges of the collar is integrally formed with the base of the mount.

Typically in such embodiments, a forward region of the collar below the flanges is free of the base of the mount to allow for the flanges to be drawn together to secure the shaft when shaft is received by the collar and the cam lever is rotated to its locked position.

Typically, the collar of the mount is oriented upright to retain the shaft in an upright position when the shaft is secured by the collar clamp.

Typically, a mount in accordance with the invention is configured for being mounted to a vehicle or other support.

In another aspect of the invention there is provided a method for mounting an antenna to a vehicle or support for the antenna, the method comprising:
 providing a mount including a collar clamp, the clamp including:
  a collar for receiving the shaft of the antenna and being in the form of an open-ended ring with outwardly directed opposed flanges spaced apart from another by a gap between the ends of the collar;
  a cam lever with a first end region terminating in at least one cam element, the cam element being rotatable about an axis of rotation of the lever; and
  a fastener with one end coupled to the cam element and having an opposite end for passage through one of the flanges of the collar and reception by the other of the flanges, the cam elements being for engagement with a bearing surface of the clamp to draw the flanges together upon the lever being rotated about its axis of rotation from an open position to a locking position for securing of the shaft by the collar, and wherein the lever is bent so as to overlie the flanges of the collar whereby an opposite end region of the lever lies side by side with respect to the fastener when the lever is in its locking position; and locating the shaft of the antenna in the collar of the collar clamp; and
 rotating the cam lever to its locked position to secure the antenna in the collar of the collar clamp.

In said method, the collar clamp can be connected to, or be integrally formed with, the mount.

Whilst a collar clamp or mount in accordance with the invention may be used for securing an antenna to a vehicle or other support structure such as a support frame or e.g., control box or module for the antenna, collar clamps and mounts as described herein are not limited thereto and may be used for other applications such as for securing the shaft of a flag to for instance, a dune buggy or golf buggy.

As used herein the term "antenna" is to be taken to be interchangeable with the term "aerial".

Advantageously, a cam lever assembly in or more embodiments as described herein can allow for the provision of quick release collar clamps and mounts incorporating a collar clamp.

Further, in one or more embodiments, when the cam lever is in its locked position, the lever can lie close to top of the flanges rather than standing proud of the collar or projecting outwardly, thereby minimising risk of damage to the assembly resulting from potential impacts to the cam lever.

Particularly advantageously, the operation of the cam lever of embodiments as described herein may reduce the risk of twisting injury to the user's wrist whilst allowing for the exertion of greater hand force on the lever to close or open the collar clamp.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers, integers or steps.

Any discussion of documents, acts, materials, devices, articles or the like that has been included in this specification is solely for the purpose of providing a context for the invention. It is not to be taken as an admission that any, or all, of these matters form part of the prior art base or were common general knowledge in the field relevant to the invention as it existed in Australia or elsewhere before the priority date of this application.

The features and advantages of the present invention will become further apparent from the following detailed description of exemplary embodiments of the invention together with the accompanying drawings.

BRIEF DESCRIPTION OF THE ACCOMPANYING DRAWINGS

DETAILED DESCRIPTION OF EXEMPLARY EMBODIMENTS OF THE INVENTION

Figure 1:
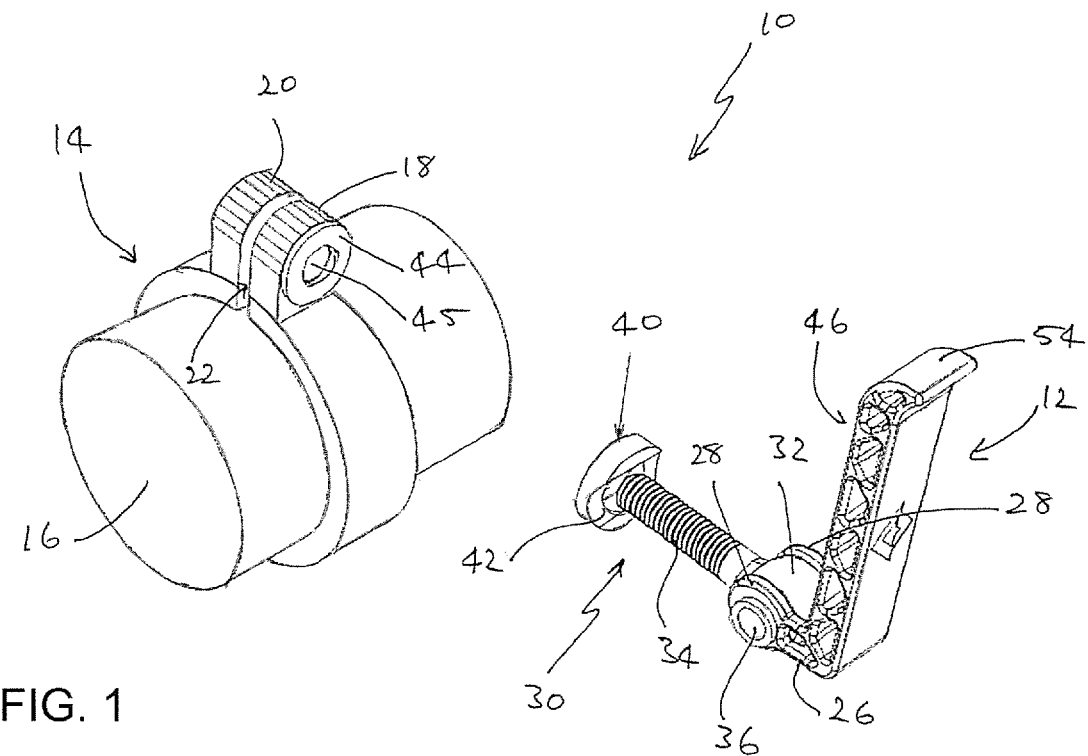
FIG. 1 is an exploded view of a collar clamp embodied by the invention.
Figure 2:
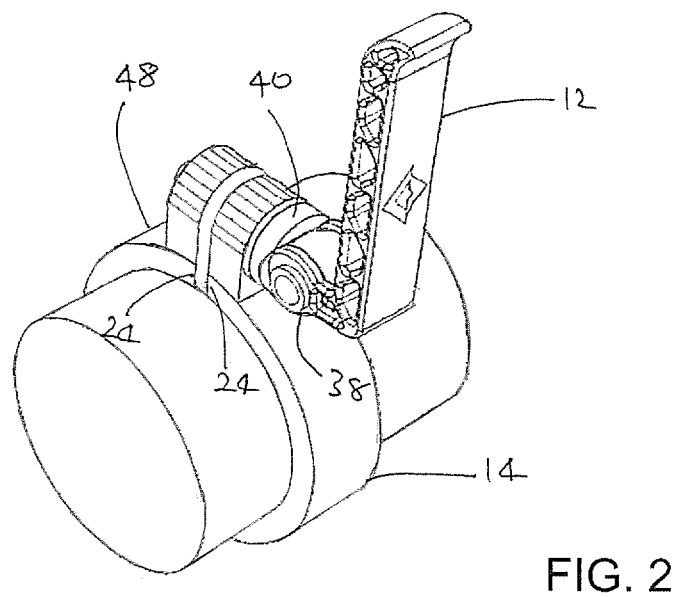
FIG. 2 is an isometric view of the collar clamp of FIG. 1 with the cam lever of the collar clamp in its open position.
Figure 3:
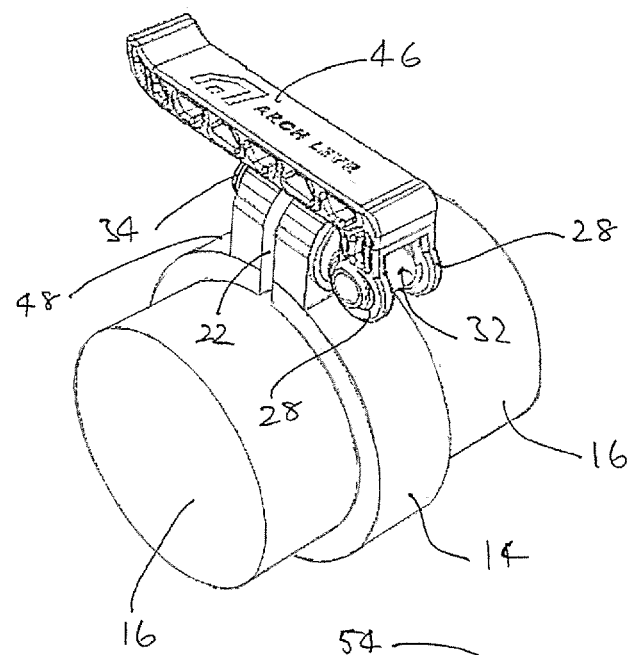
FIG. 3 is an isometric view of the collar clamp of FIG. 2 with the cam lever of the collar clamp in its locked position.

A collar clamp 10 embodied by the invention is illustrated in FIGS. 1 to 3. The collar clamp comprises a cam lever 12 and a clamp collar 14 in the form of an open ring for receiving the shaft 16 of a vehicle antenna. As shown, the collar 14 has outwardly directed opposed flanges 18 and 20 that are spaced apart from one another by a gap 22 between the ends 24 of the collar.

The cam lever 12 has a first end region 26 that terminates in opposed, spaced apart circular cam elements 28, and a fastener in the form of a metal (e.g., stainless steel) eye bolt 30 having a bulbous head 32 and a threaded shaft 34 is disposed between the cam elements of the lever. A metal pivot pin 36 received by the bulbous head of the eye bolt defines an axis of rotation of the cam lever and passes from one side of the cam lever to the other through apertures provided in the cam elements. The pivot pin 36 has a head indicated by the numeral 38 and is retained in position by a circlip fastener received by the far side of pin (not shown) though any suitable conventional means for retaining the pin in position may be utilised. The cam lever 12, fastener 30 and pivot pin 36 comprise a cam lever assembly embodied by the invention.

Figure 4:
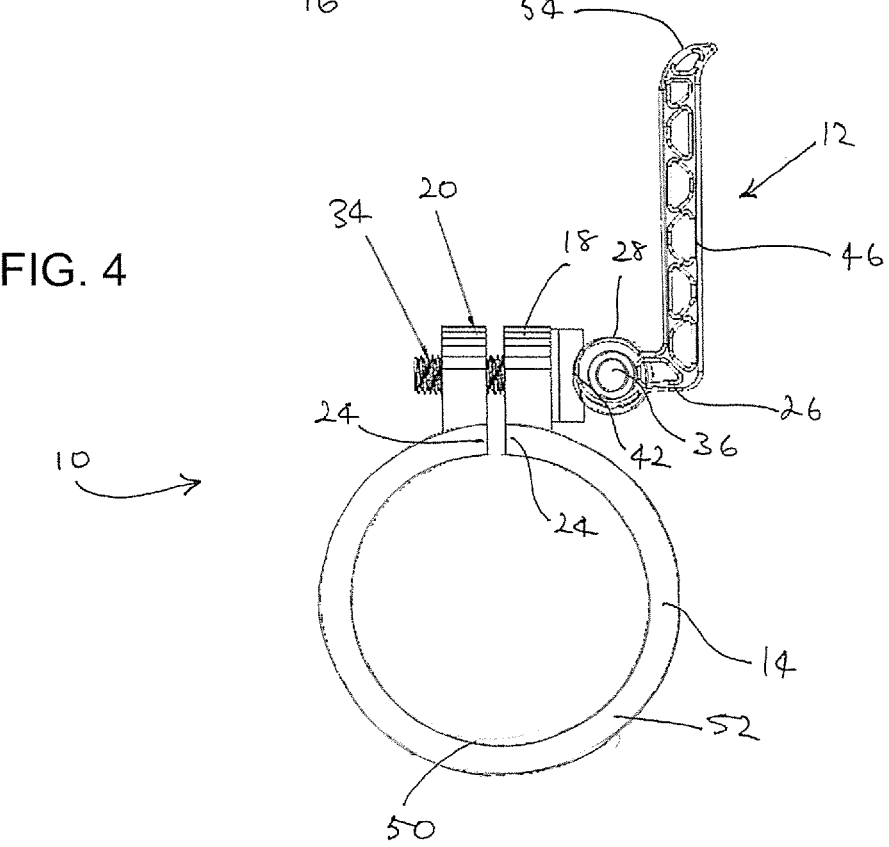
FIG. 4 is a side view of the collar clamp of FIG. 1 with the cam lever in its open position.
Figure 5:
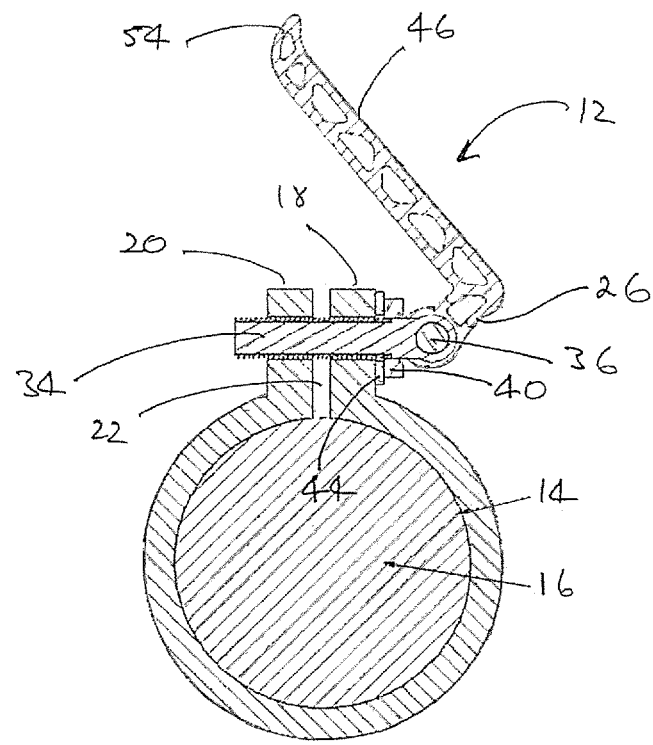
FIG. 5 is a side cross-sectional view of the collar clamp of FIG. 4.
Figure 6:
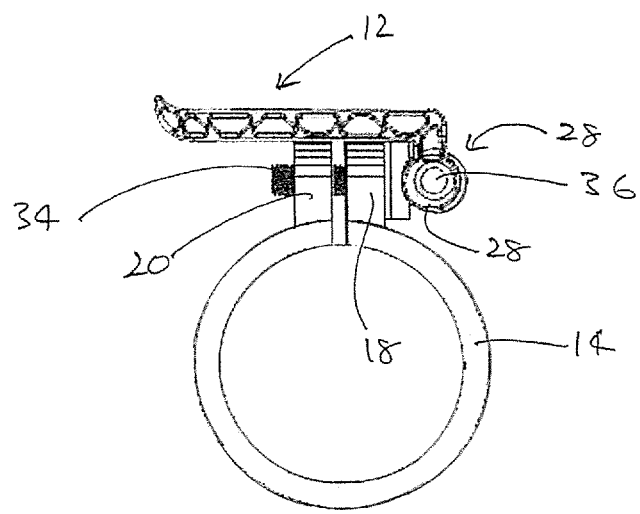
FIG. 6 is a side view of the collar clamp of FIG. 4 with the cam lever in its locked position.

As best shown in FIG. 1, the collar clamp 10 also includes a bearing washer 40 providing a bearing surface 42 for engagement with the outer periphery of the cam elements 28 of the lever 12. The washer is received on the threaded shaft of the fastener so as to be located between the cam elements 28 of the cam lever and flange 18 of the collar 14 when the clamp is assembled. In the embodiment shown, a spacer washer 44 is received on the fastener behind the washer 40, and the bearing surface of the washer 40 is concave to accommodate the outer curvature of the cam elements 28. When assembled, the shaft 34 of the fastener passes through the aperture 45 of flange 18 and threadably mates with a female thread of flange 20 as best shown in FIGS. 4 to 6.

The cam lever 12 is bent in a transverse plane of the lever so as to be essentially L-shaped with a first end region 26 of the lever terminating in the cam elements 28 being substantially perpendicular to the opposite end region 46 of the lever, the first end region 44 of the lever being shorter than the opposite end region of the lever. Thus, when the lever is in its open position as shown in FIG. 2 and FIG. 4, the first end region 26 of the lever is directed away from the flanges 18 and 20 whilst the opposite end region 46 of the lever is directed transversely with respect to the fastener. In the position shown, the end region 46 of the lever lies substantially parallel with respect to flanges 18 and 20.

To secure the shaft 16 of the antenna and thereby retain the antenna in a fixed position in the clamp 10, the shaft 34 of the fastener 30 is threaded into the flange 20 with the cam lever in its open position until the cam elements are lightly seated on the bearing surface 42 of the washer 40 and the spacer washer is held against the side face of flange 18 of the collar 14. As will be understood, the length of the first end region 26 of the lever is of a length to both space the opposite end region 46 of the lever from the side face 48 of the collar 14 and to allow that end of the lever to overlie the outer ends of the flanges 18 and 20 when the cam lever is rotated about the pivot pin 36 into its locked position to clamp the shaft of the antenna as shown in FIG. 3 and FIG. 6. If needed, one or more further spacer washers 44 can be located on the fastener's shaft behind the bearing washer to space the opposite, outer end region 46 of the lever from collar flange 18. Alternatively, a thicker spacer washer can be used or a combination of spacer washes of different thicknesses. When in the locked position, the opposite end region 46 of the lever lies alongside the collar so as to be side by side and substantially parallel to the fastener. An intermediate position of the lever is shown in the exploded view of the collar clamp illustrated in FIG. 5.

The cam elements 28 are offset with respect to the rotational axis of the lever defined by the pivot pin. The centre axis of the circular outer rim of the cam elements is therefore eccentric with respect to the pivot pin and hence the rotational axis of the lever. As such, as the cam lever is rotated from its open position to its locked position about the pivot pin 36 the cam elements progressively exert greater pressure against the bearing surface of the washer 40 whereby the flanges 18 and 20 of the collar are drawn together and the shaft of the antenna is fixedly clamped by the collar 14. Releasing the antenna so that it can be removed from the collar simply involves lifting the cam lever so that it rotates back to its open position.

The use of an L-shaped cam lever 12 as described herein allows the user to not only quickly secure and release the antenna but also to exert greater hand force on the lever when driving the lever from its open position to its locked position to secure the shaft of the antenna. Moreover, when in the locked position the opposite longer end region 46 of lever lies alongside the top of the flanges rather than projecting outwardly, reducing the possibility physical damage to the lever from inadvertent impacts. The orientation of the opposite end region 46 of the cam lever alongside the collar 14 as described herein can also reduce the risk of the lever being inadvertently knocked from its locked position so that the antenna shaft is released from the collar clamp with the potential for consequential damage to the antenna.

Whilst by "L-shaped" as used herein it is desirable that the first and opposite end regions 26 and 46 of the lever 12 lie substantially perpendicular to one another it is not essential and variation from strict perpendicularity is expressly provided for. That is, the opposite end regions may lie relative to one another at a lessor or greater angle than 90° but the cam lever will typically nevertheless retain a general L-shape for use as described herein. In some embodiments, the first and opposite end regions of the cam lever may for instance lie at an angle relative to each other in a range of from about 70° to about 110°, and more usually in a range of from about 75° to about 105° and typically, in a range of from about 80° to about 100°. Similarly, whilst it is desirable that the first and opposite end regions of the cam lever be straight as illustrated in the accompanying drawings, it is not essential and in some embodiments in accordance with the invention, one or both of the opposite end regions of lever may be curved, bowed or e.g., wavy, whereby the cam lever 12 nevertheless still wraps around the top of flange 18 of the collar to lie across flanges 18 and 20 in its locked position.

In particularly preferred embodiments, a cam lever assembly in accordance with the invention can be used in conjunction with a mount for mounting of the antenna to a vehicle (e.g., a motor vehicle, an off-road four-wheel drive (4WD) vehicle, truck, tractor, earth moving vehicle, or dune buggy) or other support. Suitable such mounts include Trimble™ "Spider" style antenna mounts/brackets (e.g., Cat No. 52070-10S; Trimble, Inc., Sunnyvale, California, United States) which comprise a collar clamp as described herein integrally formed with a base configured for being mounted to the vehicle or support, either directly or indirectly e.g., via a control box or module for operation of the antenna, by the use of mechanical fasteners (e.g., bolts or screws passing through provided bolt or screw holes of the base) which engage with anchor points of the vehicle or control box/module. More particularly, in such Trimble™ mounts, a rear region 50 of the wall 52 of the collar 14 directly opposite to the gap 22 between the flanges 18 and 20 is integrally formed with an upper region of the base of the mount, the forward portion of the collar including the flanges being free of the base thereby allowing for the flanges to be drawn together to fixedly secure the antenna in the collar clamp when the cam lever 12 is rotated about the pivot pin of the cam lever assembly to the locked position of the cam lever. Whilst a cam lever assembly of the present invention is particularly suitable for use with a Trimble™ mount of the type described above, the assembly is not limited thereto and can be used with other types of suitable mounts.

For example, in yet other embodiments, the rear region 50 of the collar 14 of the can be integrally formed with a different type of mounting arrangement or be provided with e.g., a lug or mounting bracket (e.g., on the outer face of the collar) for being secured to a mount of a vehicle or other support for the antenna by one or more mechanical fasteners.

Whilst in the embodiments described above the cam lever has a pair of opposed cam elements 28 spaced apart from one another, in other embodiments the first end region 26 of the cam lever may terminate in a single cam element for engagement with the bearing surface 42 of the washer 40. In such embodiments, for example, the head of the fastener may be forked or U shaped forming a yoke, wherein the single cam element is disposed between the forked arms of the fastener head and receives the pivot pin which extends from one of the forked arms of the fastener to the other.

The antenna secured with the use of the collar clamp as described herein can be any type of antenna such as may be selected from communication antennas, UHF antennas, citizen band (CB) antennas, mobile (cell) phone antennas, radio antennas and whip style antennas.

However, whilst a mount, collar clamp or cam lever assembly as described herein can be used to fixedly secure an antenna in position, their use is again not limited thereto and they can be used for other purposes such as securing a flag pole to a mount of a dune or golf buggy.

Likewise, a collar clamp embodied by the invention may be utilised for other purposes such as clamping a joint formed by the reception of one tube fabricated from polyvinyl chloride (PVC) or other a plastics material by another, to secure the joint together such as in e.g., a PVC pipe structure.

When in its locked position, the opposite end region 46 of the cam lever overlies the flanges 18 and 20 in contact with, or in close proximity to, the outer end of the flanges. The exposure of the lever to the risk of accidental impact in its locked position is therefore reduced with the potential for reducing inadvertent damage or loosening of the collar clamp. In this position, the lever nevertheless overhangs the flanges and is its free end is spaced from the collar ring allowing the user to readily grasp the free end of the lever for loosening of the collar clamp. This is facilitated by the provision of the outwardly turned end 54 of the lever. For example, the user may in at least some forms or instances, wrap their finger(s) around the upturned end of the lever in order to lift the lever from its locked position. Alternatively, the cam lever in its locked position can lie across the one side of flanges 18 and 20 when in its locked position rather than overlying the outer end of each of the flanges, and the first end region of the cam lever may be of a length for permitting this but not for overlying the end of the flanges.

Figure 7:
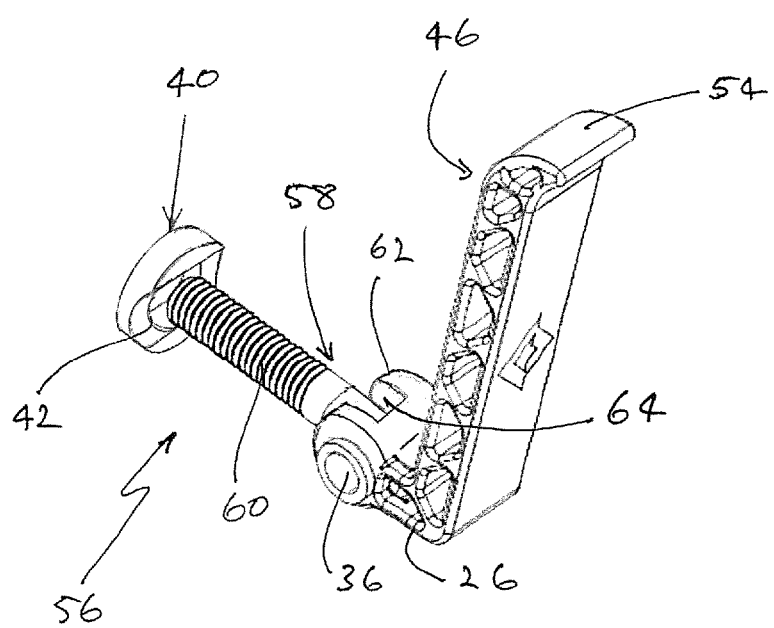
FIG. 7 is an isometric view of another cam lever embodied by the invention for use with a collar clamp as described herein.

Another embodiment of a cam lever in accordance with the invention is illustrated in FIG. 7.

In this embodiment, the cam lever 56 terminates in a single cam element 62 extending across and integrally formed with the rear of the short end region 26 of the lever. A fastener 60 in the form a threaded shaft component receives bearing washer 40 and in turn is received by the cam element 62 though a circumferentially directed slot 64 defined in the cam element. Like the embodiment shown in FIGS. 1-6 above, the fastener 60 is coupled to the cam element 62 via a pivot pin 36 that passes from one side of the cam element to its opposite side through an opening in the upper end of the fastener 60 to thereby pivotably couple the fastener to the cam element. The slot 64 in the cam element 62 that receives the fastener extends a sufficient distance circumferentially around the cam element to allow full rotation of the cam lever about the axis of rotation defined by the pivot pin between the open and the locked positions of the cam lever in use. As also with the embodiments of FIGS. 1 to 6, the pivot pin 36 passes through the cam element 62 at an offset position with respect to the centre axis of the cam lever whereby the axis of rotation of the cam lever is eccentric relative to the centre axis. The rotation of the cam lever from its open position to its locked position in use when the fastener is threadably engaged with the flange 20 of the clamp collar therefore again effects the closure of the gap 22 between the flanges 18 and 20 as described above to fasten the antenna shaft 16 in the relevant antenna mount.

Whilst in the embodiments described above the fastener is shown as threadably mating with the flange 20 of the collar, in other embodiments flange 20 may not be provided with an internal female thread and instead the fastener may pass through that flange and mate with a nut for being appropriately tightened when the cam lever is in its open position before operation of the lever to draw the flanges together as the lever is rotated to its locked position.

A cam lever as described herein can be fabricated from any suitable metal such as an aluminium, or an aluminium, titanium or other alloy or for instance, from a stainless steel, or even a suitable heavy-duty plastics material. Depending on the application, a collar 14 and mount as described herein can likewise be fabricated from any suitable metal alloy or heavy-duty plastics material deemed appropriate.

From the above description, it will be appreciated that embodiments of a cam lever assembly in accordance with the invention may provide for one or more of the following advantages:

Quick and easy securing and release of an antenna or other shaft to a vehicle or other support structure;

The exertion of greater hand force on the cam lever when securing the antenna or other shaft;

A reduction in the risk of damage to the cam lever when the cam lever is in its locked position; and A reduction in the risk of the cam lever being inadvertently released from its locked position and thereby release of the antenna or other shaft and so potential damage to the antenna or other shaft.

Although a number of embodiments of the invention have been described above it will be understood that various modifications and changes may be made thereto without departing from the invention. The above described embodiments are therefore only illustrative and are not to be taken as being restrictive.

The invention claimed is:

1. A quick release cam lever assembly for use with the collar of a collar clamp to secure a shaft when received by the collar, the collar being an open-ended ring with outwardly directed opposed flanges spaced apart from one another by a gap between the ends of the ring, and the cam lever assembly comprising:

a cam lever having a first end region terminating in at least one cam element, the cam element being rotatable about an axis of rotation of the lever; and a fastener with one end coupled to the cam element and having an opposite end for passage through one of the flanges of the collar and being securely mated with the other said flange, wherein the cam element is for exerting a force against the one flange to draw the flanges of the collar together for clamping of the shaft by the collar when the fastener is inserted through the one flange and securely mated with the other said flange and the cam lever is rotated about its axis of rotation from an open position to a locking position, and wherein the cam lever is L-shaped to allow an opposite end region of the cam lever to overlie the flanges of the collar and the fastener in a lengthwise direction of the fastener when the cam lever is in its locking position.

2. The cam lever assembly of claim 1, wherein a centre axis of the cam element is offset with respect to the axis of rotation of the cam lever, the centre axis and the axis of rotation being parallel to one another.

3. The cam lever assembly of claim 1, wherein the cam lever terminates in a pair of opposed said cam elements, the cam elements being spaced apart from one another and the one end of the fastener is disposed between the cam elements.

4. The cam lever assembly of claim 1, wherein the cam lever terminates in a single cam element and the cam lever element receives the one end of the fastener.

5. The cam lever assembly of claim 1, further comprising a pivot pin defining the axis of rotation of the cam lever, the fastener being pivotably mounted to the pivot pin.

6. The cam lever assembly of claim 5, wherein the one end of the fastener receives the pivot pin to thereby couple the fastener to the at least one cam element.

7. The cam lever assembly of claim 1, further comprising a washer received on the fastener for being located between the at least one cam element and the one said flange of the clamp, the washer providing a bearing surface for the cam element.

8. The cam lever assembly of claim 7, wherein the bearing surface of the washer is curved to accommodate the cam element.

9. The cam lever assembly of claim 1, wherein the opposite end of the fastener is threaded for threaded engagement with the other said flange of the collar.

10. The cam lever assembly of claim 1, wherein the first end region and the opposite end region of the cam lever are orientated essentially perpendicular to one another.

11. The cam lever assembly of claim 10, wherein the opposite end region of the cam lever is oriented to lie essentially parallel to the fastener when the cam lever is in its locked position in use.

12. The cam lever assembly of claim 1, wherein the shaft for being received by the collar of the collar clamp is a shaft of an antenna and the collar clamp is for securing the antenna to a mount for the antenna.

13. A collar clamp for securing a shaft, the clamp comprising:

a collar for receiving the shaft and being in the form of an open-ended ring with outwardly directed opposed flanges spaced apart from one another by a gap between the ends of the ring;

a cam lever having a first end region terminating in at least one cam element, the cam element being rotatable about an axis of rotation of the lever; and a fastener with one end coupled to the cam element and having an opposite end for passage through one of the flanges of the collar and being securely mated with the other said flange, the cam element being for exerting a force against the one flange to draw the flanges of the collar together for clamping of the shaft by the collar when the fastener is inserted through the one flange and securely mated with the other said flange and the cam lever is rotated about its axis of rotation from an open position to a locking position, and wherein the cam lever is L-shaped to allow an opposite end region of the cam lever to overlie the flanges of the collar and the fastener in a lengthwise direction of the fastener when the cam lever is in its locking position.

14. The collar clamp of claim 13, wherein the collar clamp is part of a mount for the shaft.

15. The collar clamp of claim 14, wherein a rear region of the collar opposite to the gap between the flanges of the collar is integrally formed with a base of the mount.

16. The collar clamp of claim 14, wherein the shaft for being received by the collar clamp is the shaft of an antenna.

* * * * *